United States Patent [19]
Johnson

[11] Patent Number: 5,960,812
[45] Date of Patent: Oct. 5, 1999

[54] FLUID FLOW CONTROL VALVE

[75] Inventor: A. David Johnson, San Leandro, Calif.

[73] Assignee: TiNi Alloy Company, San Leandro, Calif.

[21] Appl. No.: 08/900,885

[22] Filed: Jul. 25, 1997

[51] Int. Cl.$^6$ .......................... F16K 17/40; F16K 31/70
[52] U.S. Cl. .......................... 137/68.14; 137/67; 251/11
[58] Field of Search .................. 137/67, 68.11, 137/68.14, 68.15, 68.16, 68.17; 251/11

[56] References Cited

U.S. PATENT DOCUMENTS

| | | | |
|---|---|---|---|
| 2,608,996 | 9/1952 | Forman | 251/11 |
| 2,610,300 | 9/1952 | Walton et al. | 251/11 X |
| 2,647,017 | 7/1953 | Coulliette | 251/11 X |
| 4,072,159 | 2/1978 | Kurosawa | 137/67 |
| 4,096,993 | 6/1978 | Behr | 251/11 X |
| 4,340,049 | 7/1982 | Munsch | 137/68.11 X |
| 4,619,284 | 10/1986 | Delarue et al. | 137/67 |
| 4,654,191 | 3/1987 | Krieg | 137/68.14 X |
| 5,119,555 | 6/1992 | Johnson | 29/254 |

*Primary Examiner*—John Rivell
*Attorney, Agent, or Firm*—Flehr Hohbach Test Albritton & Herbert LLP

[57] ABSTRACT

A valve and method of operation for controlling the flow of fluid from a pressurized fluid source while maintaining a secure seal against fluid leakage over long periods of time. The valve includes a valve body formed with an inlet channel which extends through a strain concentrating portion. The strain concentrating portion has an ultimate strength less than that of support portions of the body. An actuator applies a load to the valve body sufficient to create a stress which exceeds the ultimate strength of the strain concentrating portion. The strain concentrating portion then fractures into parts separated by a gap. The fracture forms openings from the inlet channel into the gap to create a flow path from the fluid source into an outlet channel.

11 Claims, 3 Drawing Sheets

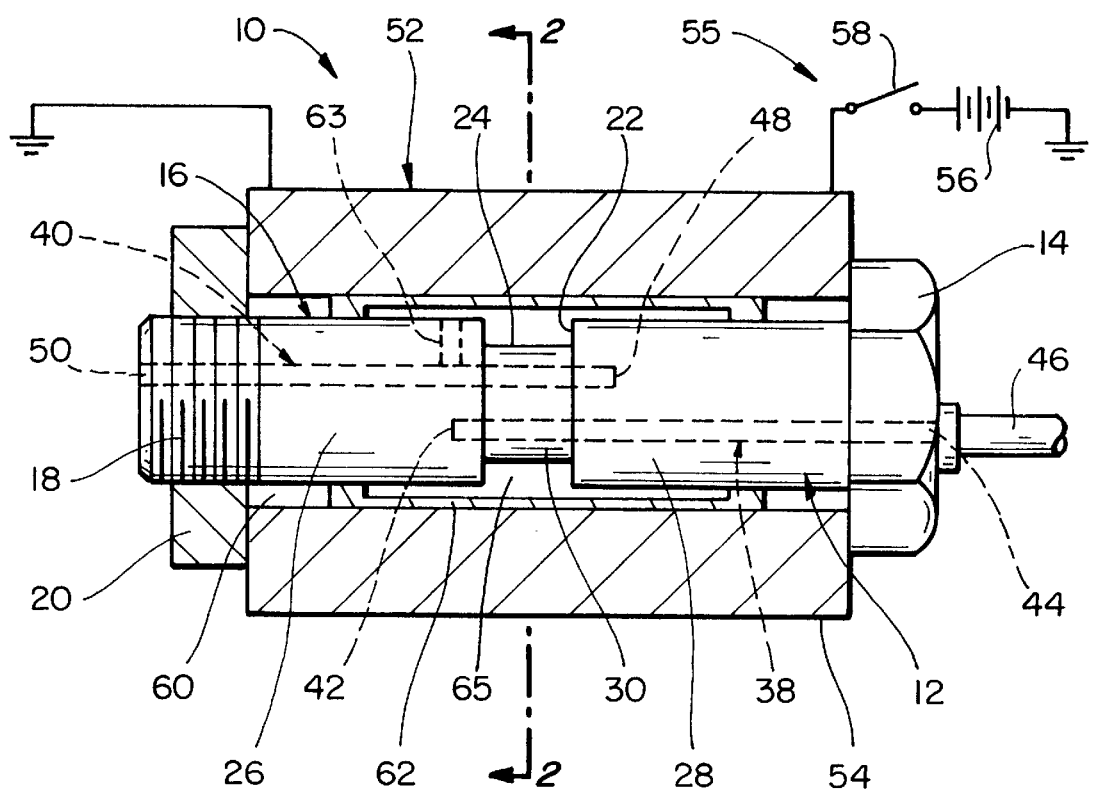
FIG_1

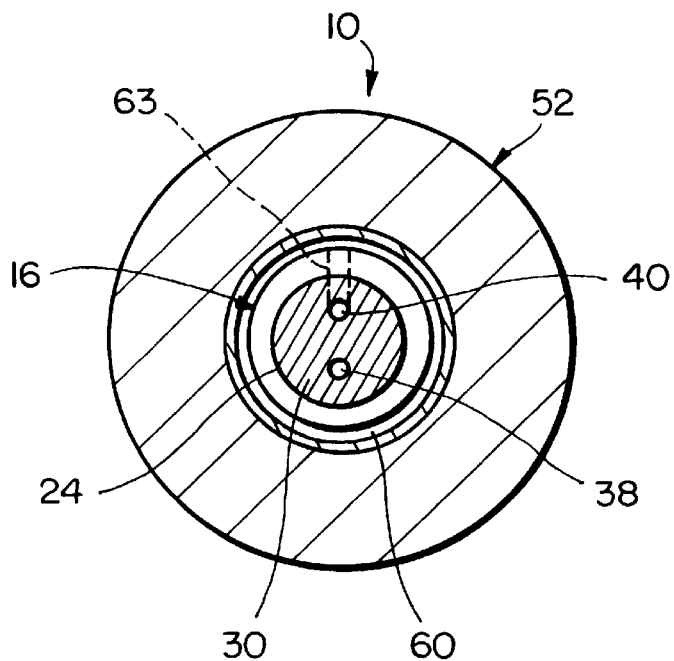
FIG_2
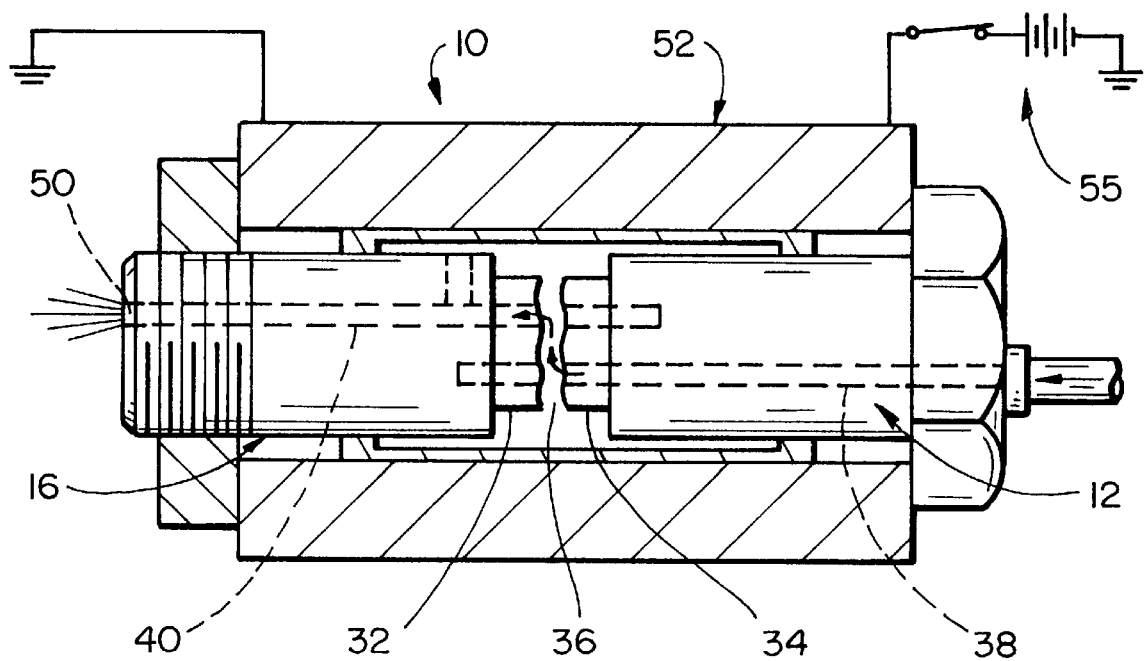
FIG_3

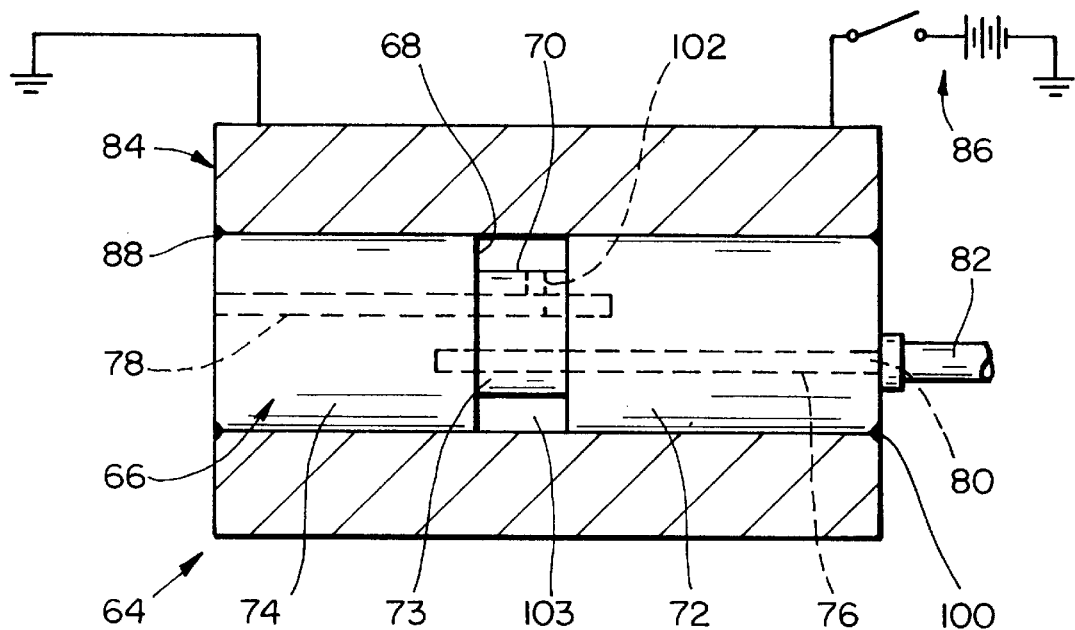
FIG_4
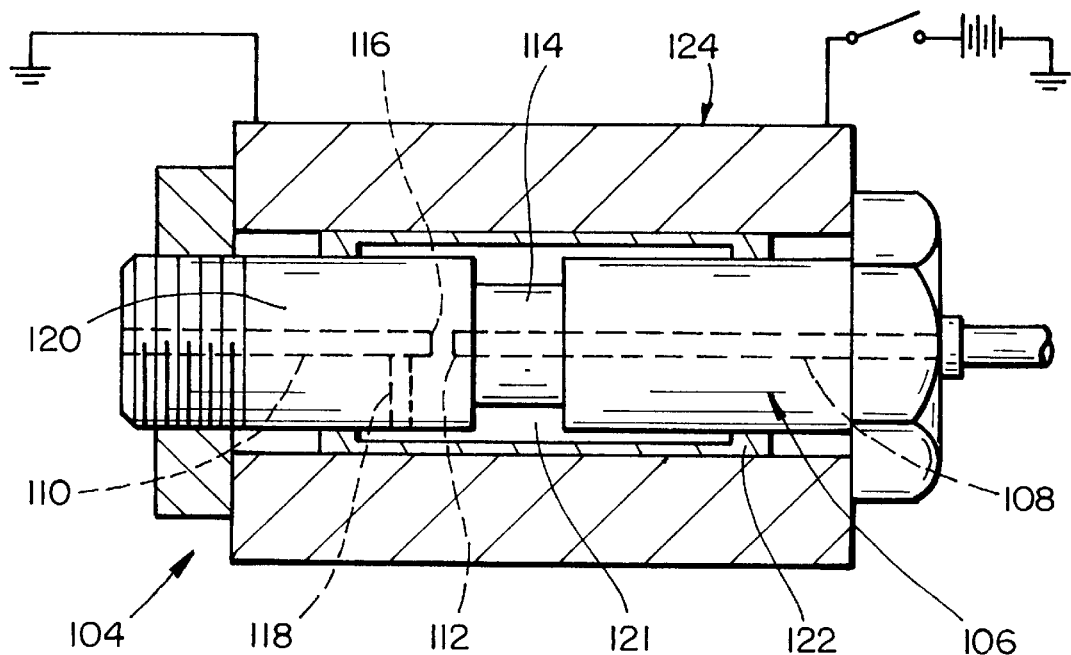
FIG_5

FLUID FLOW CONTROL VALVE

BACKGROUND OF THE INVENTION

1. Field of the Invention

This invention relates in general to valves for controlling fluid flow. More particularly, the invention relates to valves for controlling the release of a high pressure fluid such as gas contained in a pressure vessel with the valve being secured against leakage over long periods of time.

2. Description of the Related Art

In aerospace and other applications it is frequently necessary to establish a secure, non-leaking, seal of a gas under high pressure over a long period of time and then subsequently release the gas for use in its intended purpose. Examples include spacecraft with pressure vessels containing propellant gases needed for deceleration and attitude control. The pressurized gases must be secured against leakage for years before the spacecraft reaches its destination at which time the propellant must be released. Ordinary release valves in general do not seal well enough to contain pressurized gas over long periods of time.

Heretofore spacecraft have been provided with "pyrovalves" which enable secure gas seals. However, such valves are activated by means of explosives to rupture welded lines which are in communication with the pressure vessels. Because of the great force created by the explosions when the pyrovalves are actuated, they have disadvantages from the standpoint of safety, weight, reliability and mechanical shock to the spacecraft.

The need has therefore been recognized for a release valve which can maintain a fluid pressure seal over long periods of time and which obviates the foregoing and other limitations and disadvantages of the prior art valves of this type. Despite the various release valves in the prior art, there has heretofore not been provided a suitable and attractive solution to these problems.

OBJECTS AND SUMMARY OF THE INVENTION

It is a general object of the present invention to provide a new and improved valve for releasing a fluid from a pressure vessel.

Another object is to provide a valve of the type described which can maintain a secure and non-leaking seal for the gas in the pressure vessel over long periods of time.

Another object is to provide a valve of the type described which can be employed on spacecraft for maintaining a secure fluid seal over long periods of time while being easily actuated to release the fluid for the desired use.

The invention in summary provides a release valve with a valve body comprising a support portion and a strain concentrating portion. The strain concentrating portion is formed so that its ultimate strength is less than the ultimate strength of the support portion. When a sufficient load is applied to the valve body the strain concentrating portion fractures into parts which are separated by a gap. The fracture creates an opening into the gap from an inlet channel which is provided in the valve body. This creates a flow path from the fluid source through the inlet channel into the gap and thence through an outlet channel. An actuator is provided for applying the load to the valve body.

The foregoing and additional objects and features of the invention will appear from the following description in which the preferred embodiments have been set forth in detail in conjunction with the drawings.

BRIEF DESCRIPTION OF THE DRAWINGS

FIG. 1 is an axial section view of a valve in accordance with one embodiment of the invention showing the valve elements before actuation.

FIG. 2 is a cross sectional view taken along the line 2—2 of FIG. 1.

FIG. 3 is a view similar to FIG. 1 showing components of the valve following actuation thereof.

FIG. 4 is an axial section view of a valve in accordance with another embodiment of the invention.

FIG. 5 is an axial section view of a valve in accordance with another embodiment.

DESCRIPTION OF THE PREFERRED EMBODIMENTS

In the drawings FIGS. 1–3 illustrate generally at 10 a valve in accordance with one embodiment of the invention. Valve 10 is illustrated in a configuration which is suitable for use for controlling release of a pressurized fluid such as gas from a chamber or pressurized container, not shown, on a spacecraft. While this embodiment will be explained in relation to use with a spacecraft application, the invention can be adapted for use in a wide variety of other end use applications, as will appear from the following.

Valve 10 is comprised of a valve body 12 which, in the illustrated embodiment, is in the form of a bolt having a bolt head 14 and cylindrical shank 16. The tail end of the shank is formed with threads 18 for receiving a capture nut 20.

An annular groove 22 is formed at a midportion of the bolt shank. The groove forms a cylindrical land 24 having an outer diameter which is less than the outer diameter of the shank support portions 26, 28 which are on either side of the land.

The dimensional relationship between the outer diameter of land 24 the outer diameters of support portions 26 and 28 is predetermined so that, when a tensile load is applied to the bolt along its longitudinal axis, a portion of the resulting stress is localized in the reduced cross sectional area portion of the land which in turn results in concentration of the strain in that portion. Thus the volume encompassed by the land creates a strain concentrating portion 30. This follows from the well-known Hooke's Law $$E = S/\epsilon \qquad \text{(Equation 1)}$$

where E is the modulus of elasticity for the material of valve body, S is the stress and $\epsilon$ is the strain.

Equation 1 give the tensile strain below the proportional limit, which is equal to the average elongation in the direction of the applied force. The ultimate strength of the material of the valve body is its maximum resistance to tensile forces when there is a total load-producing fracture, that is the maximum stress prior to fracture. The invention also contemplates a valve body which is configured in a suitable manner to fracture responsive to either compression or shear loads. In the case of compression loads, the material has an ultimate compression strength where the maximum load would produce a fracture in a strain concentrating portion formed in a brittle material.

When the valve body fractures responsive to a load which produces a stress beyond the ultimate strength in the strain concentrating portion, the fracture occurs in the manner shown in FIG. 3 such that the strain concentrating portion is separated into parts 32 and 34 which are spaced apart by a gap 36. The land comprises a fracture zone such that the fracture can occur across any portion of the land.

Valve body 12 is formed with an inlet channel 38 and outlet channel 40. Inlet channel 38 is formed by a hole which is bored through bolt head 14, shank support portion 28 and across land 30 where it terminates at a blind end 42. An inlet end 44 on channel 38 is coupled with tubing 46 which connects with the pressure chamber or vessel, not shown. Outlet channel 40 is formed by a hole bored into the distal end of the shank, through the shank supporting portion 26 and across land 30 where it terminates at a blind end 48. The inlet and outlet channels are separate within the valve body so that fluid cannot communicate between them. The outlet channel has an outlet end 50 which, as shown in FIG. 3, discharges a jet of fluid outwardly from the valve body. As desired, the outlet end could be coupled with tubing, not shown, for directing the fluid to the desired end use application.

When the strain concentrating portion fractures to create gap 36 as shown in FIG. 3, the portions of the inlet and outlet channels within the fracture zone are opened to the gap. This enables pressurized fluid to flow from the fluid source through inlet channel 38, into the gap and thence through outlet channel 40 for discharge through its outlet opening. The valve operation is non-reversible.

While the illustrated embodiment shows penetration of the inlet and outlet channels through opposite ends of the valve body, the invention contemplates that the channels could penetrate from only one side. In that case the channels would extend in parallel relationship through the fracture zone with their blind ends terminating within the same shank support portion. In such a configuration the fluid flow from the inlet channel would follow a U-turn through the fracture gap before being directed in a reverse direction through the outlet channel.

An actuator 52 is provided for applying a sufficient tensile load to the valve body so that the stress on the strain concentrating portion exceeds its ultimate strength and fractures. Actuator 52 comprises a hollow cylinder 54 which is mounted concentric about the shank of the valve body. Cylinder 54 is formed of a solid state phase-change material having a shape memory as disclosed in U.S. Pat. No. 5,119,555, entitled "Non-Explosive Separation Device" (owned by the assignee of the present invention), the disclosure of which is incorporated herein by this reference. As disclosed in that patent, the phase-change material is a shape memory alloy (also termed SMA), preferably TiNi (Nitinol), an alloy of nearly equal atomic amounts of nickel and titanium. Also as disclosed in that patent, other suitable shape memory materials that can be employed include CuAlNi and TiNiPd alloys.

In the present embodiment, when the SMA material of actuator 52 is cold (i.e. at a temperature below the transition temperature) it is deformed to the armed shape shown in FIG. 1 with one end of the actuator abutting bolt head 14 and the other end abutting nut 20. Suitable means is provided for heating the SMA material through its phase-change temperature. In the illustrated embodiment the heating means is shown schematically as an electric circuit 55 powered by a battery 56 and controlled by an on-off switch 58 for directing a current through the length of the actuator. The electrical resistivity of the SMA material to the current causes the heating effect. When the transition temperature is reached, the SMA material undergoes a thermo-elastic phase transformation in passing from a martensitic phase at the cold shape to a parent austenitic phase in a memory shape. As much as joule per gram of work may be accomplished in the shape recovery. Actuator 52 recovers by axial elongation and in doing so exerts tensile forces axially which are carried through bolt head 14 and nut 20 into the valve body.

The invention contemplates that other heat sources could be employed, such as a coil of resistance heating wire which encircles the actuator and is connected through a suitable control circuit with an electrical power source, not shown.

An annular space 60 is formed between the inner surface of the actuator and the outer surfaces of shank support portions 26 and 28. An annular seal or gasket 62 is fitted within the space. The opposite ends of the gasket are secured as by welding to the outer surfaces of shank support portions. The gasket can advantageously be formed of a soft malleable metal which stretches under the axial load received from the actuator. At the same time the gasket maintains a fluid-tight seal to prevent leakage of fluid from between the valve body and actuator when the strain concentrating portion fractures.

A transverse bore 63 is formed through support portion 26 and penetrates into one side of outlet channel 40. This bore provides fluid communication in a pathway between the outlet channel and the chamber 65 which is formed between gasket 62 and the valve body. This pathway enables the testing for gas leakage into the chamber.

FIG. 4 illustrates a valve 64 in accordance with another embodiment of the invention. Valve 64 is comprised of a valve body 66 which has a configuration similar to the valve body described for the embodiment of FIGS. 1–3 except that the bolt head, threaded distal end and nut are eliminated. The valve body is formed with a groove 68 which forms a land 70 defining a strain concentrating portion 73 between shank support portions 72 and 74 in a manner similar to that described for the foregoing embodiment. Holes are bored axially through opposite ends of the valve body to provide inlet and outlet channels 76 and 78. An inlet end 80 of the inlet channel is coupled through tubing 82 with a pressurized fluid source, not shown. A hollow cylindrical actuator 84 is provided and is comprised of an SMA material of the type described for the embodiment of FIGS. 1–3. Heating means shown schematically by electrical circuit 86 is provided for heating the actuator through its phase-change temperature.

In the embodiment of FIG. 4 the opposite end portions of the valve body are secured to the surrounding end portions of the actuator by suitable means such as welding or brazing at the end margins 88 and 100 of the interface between these components. This means of attachment enables the actuator to expand to its memory shape while applying a tensile load on the valve body and at the same maintain a fluid-tight seal at the welded ends to prevent leakage of fluid when the strain concentrating portion fractures.

A transverse bore 102 is formed through land 70 into one side of outlet channel 78. This bore provides a pathway into the annular chamber 103 between the land and actuator for purposes of testing for any gas leakage through the seals in margins 88 and 100.

FIG. 5 illustrates a valve 104 in accordance with another embodiment of the invention. Valve 104 is comprised of a valve body 106 which has a configuration similar to the valve body described for the embodiment of FIGS. 1–3 except for the positioning of the inlet and outlet channels. In this embodiment the inlet channel 108 and outlet channel 110 are concentric with the valve body, thereby simplifying the manufacturing steps. Blind end 112 of the inlet channel extends through the fracture zone created at strain concentrating portion 114 of the valve body. The blind end 116 of the outlet channel is axially spaced from blind end 112. A transverse bore 118 is formed through support portion 120 and penetrates into one side of the outlet channel. This bore not only provides a pathway for testing for gas leakage into the chamber 121 beneath seal 122 but also forms a part of the outlet pathway when strain concentrating portion 114 is fractured upon operation of SMA actuator 124.

The invention also contemplates that in any of the foregoing embodiments the seals could be eliminated. Such a modification would find use in certain end-use applications where only a one-time release of the pressurized gas would not be required and sealing around the strain concentrated portions is not important.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A valve for controlling the flow of fluid from a pressurized fluid source, the valve comprising the combination of a valve body having an inlet channel and an outlet channel, the inlet channel having an inlet end for fluid communication with the fluid source, the valve body comprising a bolt having a head end and a shank, the shank having a strain concentrating portion which fractures into first and second parts separated by a gap along a fracture zone responsive to a load applied to the bolt, the inlet channel having an end portion which terminates within the strain concentrating portion whereby an opening is formed from the end portion into the gap responsive to said fracturing of the strain concentrating portion for enabling fluid from the source to flow through the inlet channel and opening into the gap.

2. A valve as in claim 1 in which the load is a tension load.

3. A valve as in claim 1 in which the support portion has a first minimum cross sectional area, and the strain concentrating portion has a second minimum cross sectional area which is less than the first cross sectional area.

4. A valve as in claim 1 in which the valve body has an outlet channel, and the inlet and outlet channels have respective first and second end portions which terminate in the strain concentrating portion.

5. A valve for controlling the flow of fluid from a pressurized fluid source, the valve comprising the combination of a valve body having an inlet channel and an outlet channel, the inlet channel having an inlet end for fluid communication with the fluid source, the valve body comprising a bolt having a head end and a shank, the shank having a strain concentrating portion which fractures into first and second parts separated by a gap along a fracture zone responsive to a load applied to the bolt, the inlet channel having an end portion which terminates within the strain concentrating portion whereby an opening is formed from the end portion into the gap responsive to said fracturing of the strain concentrating portion for enabling fluid from the source to flow through the inlet channel and opening into the gap, and further comprising an actuator formed of a solid state phase change material having a shape memory which recovers from an armed shaped to a memory shape when heated through the material's phase-change temperature while applying the load to the valve body, and means for heating the actuator through the phase-change temperature.

6. A valve as in claim 5 in which load is a tension load and the actuator comprises a solid state phase change material having a shape memory which recovers from an armed shaped to a memory shape when heated through the material's phase-change temperature while applying the load to the valve body, and means for heating the actuator through the phase-change temperature.

7. A valve for controlling the flow of fluid from a pressurized fluid source, the valve comprising the combination of a valve body having an inlet channel and an outlet channel, the inlet channel having an inlet end for fluid communication with the fluid source, the valve body comprising a bolt having a head end and a shank, the shank having a strain concentrating portion which fractures into first and second parts separated by a gap along a fracture zone responsive to a load applied to the bolt, the inlet channel having an end portion which terminates within the strain concentrating portion whereby an opening is formed from the end portion into the gap responsive to said fracturing of the strain concentrating portion for enabling fluid the source to flow through the inlet channel and opening into the gap, and further comprising a chamber about the strain concentrating portion, the chamber being in fluid communication with the outlet, and a seal between the chamber and valve body for sealing the chamber from leakage.

8. A valve as in claim 7 which further comprises an outlet channel at least partially within the valve body, and the valve body includes a test pathway channel from the outlet channel to the chamber.

9. A method for controlling the flow of fluid between a pressurized fluid source and a downstream flow path, the method comprising the steps of: providing a valve body with a support portion having a first ultimate strength and a strain concentrating portion with a second ultimate strength which is less than the first ultimate strength, providing the valve body with an inlet channel having a blind end within the strain concentrating portion, directing fluid from the pressurized fluid source into the inlet channel, applying a load to the body sufficient to produce a strain in the body by providing an actuator comprising a solid state phase change material having a shape memory which recovers from an armed shape to a memory shape when heated through the material's phase-change temperature, heating the actuator through the phase-change temperature and causing the actuator to apply the load on the valve body responsive to said recovery of the actuator to the memory shape, concentrating a portion of strain at a fracture zone in the strain concentrating portion in an amount which is sufficient to strain the fracture zone beyond the second ultimate strength, fracturing the strain concentrating portion into first and second parts having faces which are separated by a gap in the fracture zone, opening fluid communication between the inlet channel and the gap, and directing fluid along a path from the inlet channel through the gap into the downstream flow path.

10. A method as in claim 9 in which: the step of applying the load is carried out by applying a tensile load on the valve body, causing the actuator to deform by expanding in length while applying the tensile load.

11. A method as in claim 10 in which: the step of applying the load is carried out by providing a solid state phase change material having a shape memory which recovers from an armed shaped to a memory shape when heated through the material's phase-change temperature, heating the actuator through the phase-change temperature, and causing the actuator to apply the tensile load on the valve body responsive to said recovery of the actuator to the memory shape.

* * * * *